(No Model.)  2 Sheets—Sheet 1.

J. F. MUNSIE.
UNDERGROUND CONDUIT FOR ELECTRIC CONDUCTORS.

No. 356,151.  Patented Jan. 18, 1887.

Witnesses.
Saml. B. Dover.
Freeman Lane

Inventor
James F. Munsie.
by Geo. W. Levin.
Att'y.

N. PETERS, Photo-Lithographer, Washington, D. C.

(No Model.) 2 Sheets—Sheet 2.

J. F. MUNSIE.
UNDERGROUND CONDUIT FOR ELECTRIC CONDUCTORS.

No. 356,151. Patented Jan. 18, 1887.

Witnesses.
Saml. B. Dover.
Freeman Lane

Inventor:
James F. Munsie
by Geo. W. LeVin.
Att'y

UNITED STATES PATENT OFFICE.

JAMES F. MUNSIE, OF CHICAGO, ILLINOIS.

UNDERGROUND CONDUIT FOR ELECTRIC CONDUCTORS.

SPECIFICATION forming part of Letters Patent No. 356,151, dated January 18, 1887.

Application filed July 30, 1886. Serial No. 209,555. (No model.)

*To all whom it may concern:*

Be it known that I, JAMES F. MUNSIE, a British subject, residing at Chicago, in the county of Cook and State of Illinois, have invented certain new and useful Improvements in Underground Conduits for Electric Conductors, of which the following is a full, clear, and exact description, reference being had to the accompanying drawings, and to the letters of reference marked thereon, which form part of this specification.

The principal object of my present invention is to provide within an underground conduit system for electric conductors means by which the wires or cables extending through each duct of such system may be distributed for operative purposes to the best possible advantage; to this and other ends, as will further appear, the same consisting in the several matters hereinafter set forth, and pointed out in the appended claims.

Figure 1:
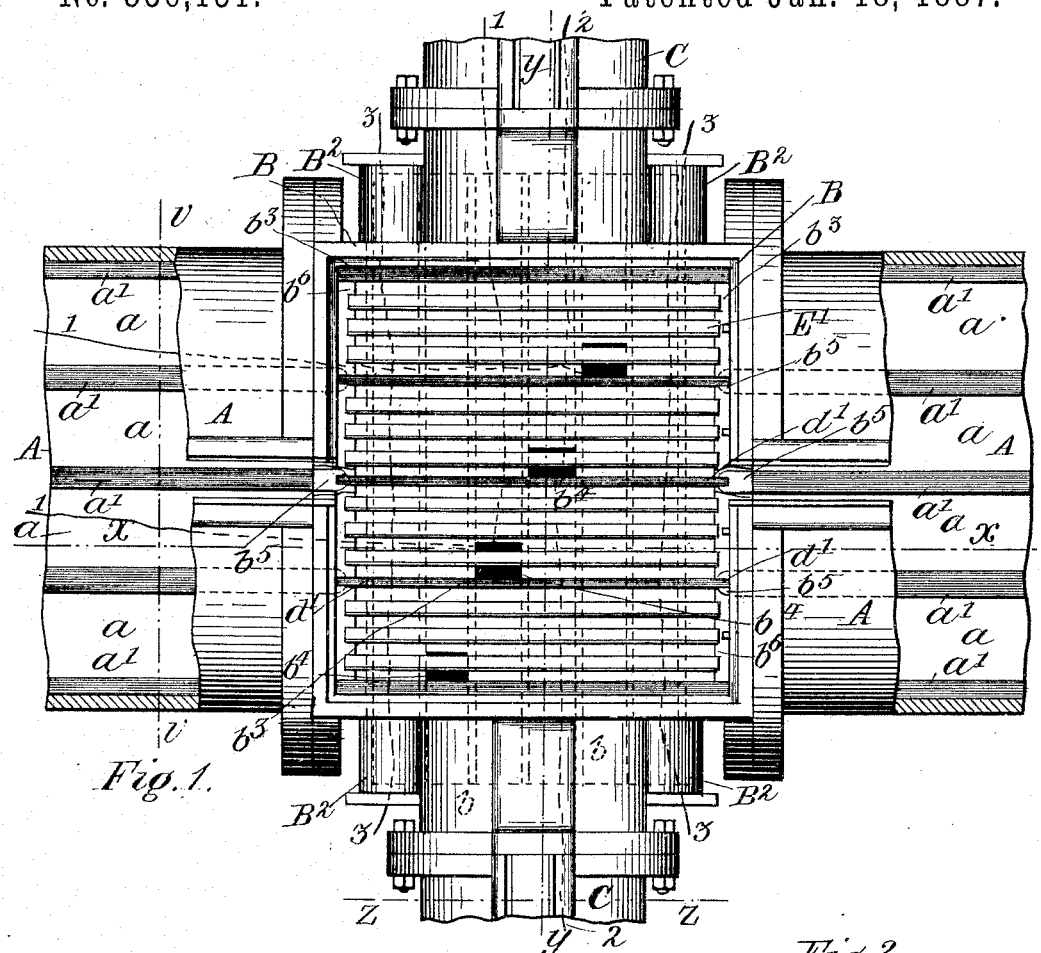
Figure 2:
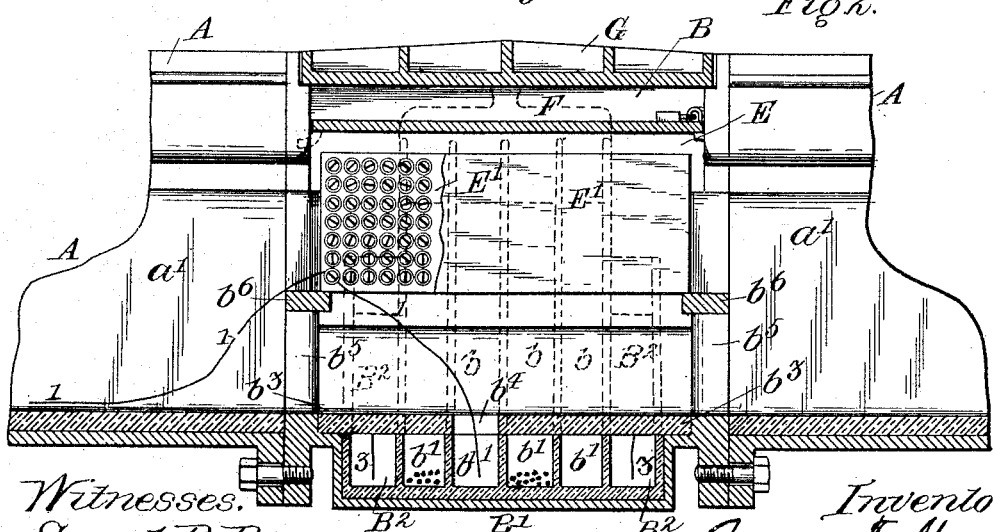
Figure 3:
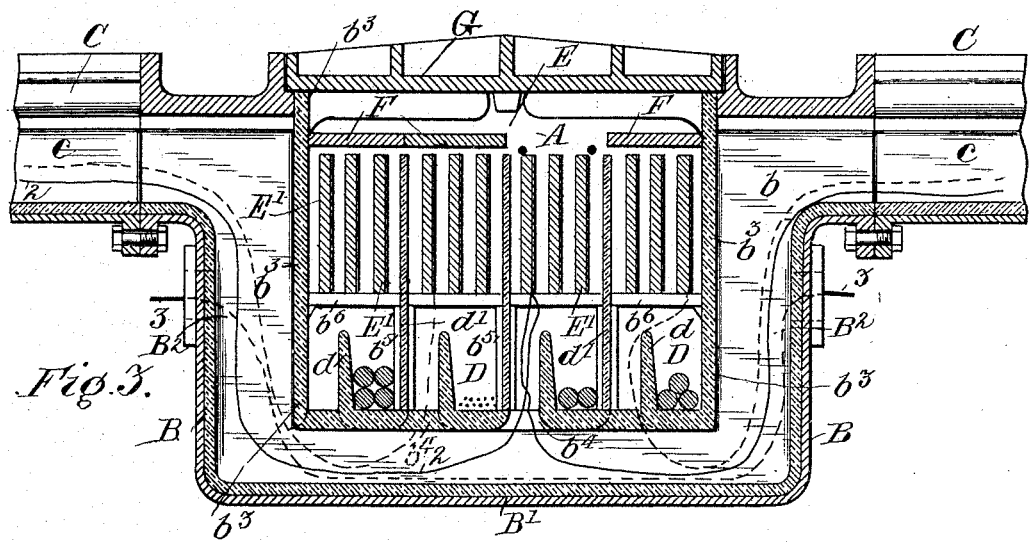
Figure 4:
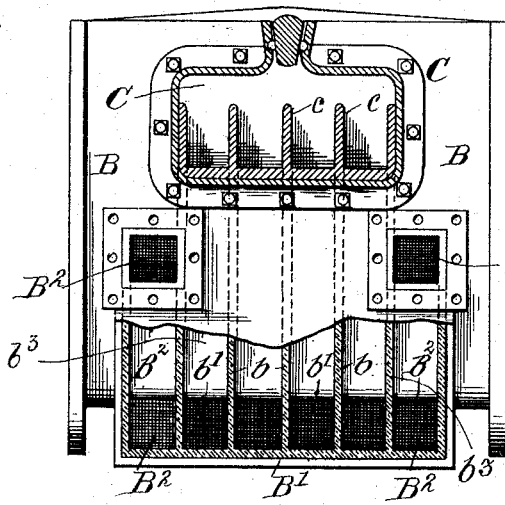
Figure 5:
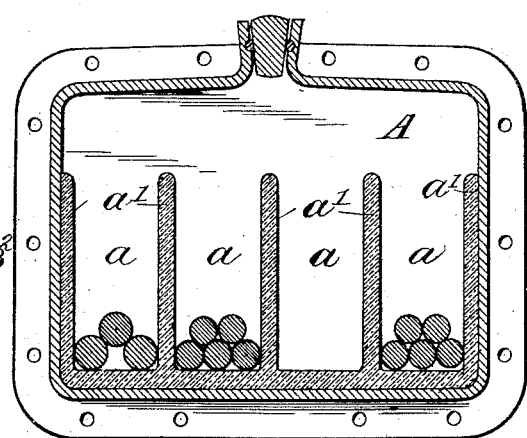
Figure 6:
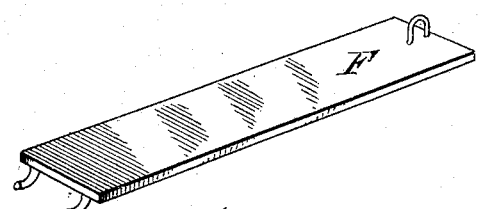

In the accompanying drawings, Figure 1 is a plan detail of a conduit station or well with its cover removed, substantially illustrating my said invention and its operative connection with the main line and distributing branches of the system, which are likewise shown, the station or well being arranged and adapted, as a matter of preference, to a conduit provided with a series of wire or cable ducts or compartments. Fig. 2 is a longitudinal section of said station or well and main line of conduit taken upon the line X X of said Fig. 1. Fig. 3 is a transverse section of the construction shown in said Fig. 1, being taken upon the line Y Y thereof. Fig. 4 is a side elevation (in part broken away) of the station or well and one of the distributing branches shown in Fig. 1, said view being taken on the line Z Z thereof. Fig. 5 is a transverse section of the main conduit, taken upon the line V V of said Fig. 1. Fig. 6 is a detail illustrating one of the plates shown in Figs. 1 and 2, employed for covering the sub compartments of the upper compartment, E, of the station or well B.

At suitable points through the length of the conduit are located in fixed connection therewith stations or wells B, from which project wire distributing or diverging branches C of the main line A. Within said station or well B is located a U-shaped diaphragm or sub-well, $b^3$, of smaller dimensions, which divides the same into distinctive compartments, as shown, the inner compartment or sub-well being divided by vertical spacing-ribs or partitions $d'$ into sub-compartments D, which extend longitudinally parallel with the main line of conduit and form continuations or extensions through the station of the ducts or compartments $a$ thereof, and the outer compartment, B', being divided by spacing-ribs $b$ into sub-compartments or ducts $b'$, which extend in a direction transverse the running direction of said sub-compartments D to the points of connection with the well B of the diverging or the distributing branches C of the conduit. Within said chamber $b^3$, and supported at a suitable distance above the floor thereof, preferably by standards $b^5$, is located a frame, $b^6$, which sustains binding-post boards E', the spaces within which said boards are located being continuations of said sub-compartments D, and being designated as sub-compartments E, which are closed by means of removable plates F, adapted and arranged each to cover one of the said sub-compartments thereof. From each sub-compartment D an opening or passage, $b^4$, is entered through the floor thereof into a corresponding duct or sub-compartment, $b'$. To the mouth of the station or well B is adapted a cover, G, which may be secured in position by any preferred means. Contiguous to said compartments $b'$, but isolated therefrom, is extended around said station or well B compartments or ducts $B^2$, (provided, when not employed for operative purposes, with removable caps or covers, not shown,) said compartments or ducts being intended and arranged to connect with sub-conduits or other suitable auxiliaries to the main system, when necessary or desirable, for the purpose hereinafter described.

In the main conduit A, I preferably employ spacing-ribs $a'$, for the purpose of dividing the interior thereof into compartments $a$, as particularly shown in Fig. 5, the sub-compartments E and D of the chamber $b^3$ extending longitudinally parallel and being of even number therewith. In the distributing branches C, I also preferably employ spacing-ribs $c$, which form compartments in said branches corresponding to the compartments $b'$, formed within said well or station, which extend in a direction opposite to that of said other compartments.

The office of each particular feature of my invention will readily be comprehended from the following description of its operation: Wires or cables running without deflection through the system pass into and athwart the station or well through the sub-compartments D of the sub-well $b^3$, each particular class or series or system of wires or cables being contained, in passing through said chamber, in a compartment or compartments which separate the same from those of another class. When it becomes necessary to change the running direction of a wire or cable, the same is run downwardly from its compartment within said chamber $b^3$, through one of the passages or openings $b^4$, into a corresponding lower compartment or duct, $b'$, and thence into the proper distributing branches C. Preliminary to entering individual wires or cables into the said lower compartments, $b'$, (unless no benefit would be derived from arranging them for testing purposes within the station or well—as, for instance, if the wires contained within a cable were to be separated for distribution purposes at a point beyond said station or well,) the same would be connected to binding-posts forming part of the boards E', and thence passed downward into and through said lower compartments or ducts, $b'$, into said diverging or distributing branches.

Within the compartments or ducts $B^2$, I locate dead-wires 3. (Shown particularly in Figs. 1 and 3 as projecting from the ends thereof.) To these compartments or ducts, as occasion may require, service-pipes containing electric-light wires are attached, and the wires contained therein connected with said dead-wires 3, thus enabling the intersecting of the conduit in the operation of transverse-running wires, which are essential to the economical operation of a lighting system, and obviating the under running of the conduit.

The compartments or ducts $B^2$ are isolated from the interior of the station or well and the chamber $b^3$, in order to absolutely separate wires of a very high potential from other wires, the utility of which might otherwise be greatly impaired thereby. While I have shown the compartments or ducts $B^2$ as forming part of the well B, or being attached thereto, the same may be attached to or form part of the conduit system intermediate said stations or wells, or at any desirable point or points throughout the system.

It is apparent that various modifications of the details of construction and arrangement which I have shown and described may be made without deviating from the intent and scope of my invention. I therefore do not limit myself essentially to such details.

What I claim as new, and desire to secure by Letters Patent, is—

1. In a conduit system for electric conductors, a distributing station or well, B, provided with an inner chamber or sub-well, $b^3$, the interior of which forms a continuation or extension through said station of the duct or ducts composing the conduit to which it is connected, and an outer compartment, B', forming one or more ducts, $b'$, which extend to or about the point or points of connection with said station of the diverging or distributing branches C of the conduit, said duct or ducts $b'$ being connected with the duct or ducts formed by or interior of the chamber or sub-well $b^3$, each by a suitable opening, $b^4$, formed through the floor of said chamber, all arranged and adapted to be operated substantially as and for the purposes described.

2. In a conduit system for electric conductors, a distributing station or well, B, provided with an inner chamber or sub-well, $b^3$, and a compartment, B', contiguous thereto, provided with a suitable number of distributing-ducts, $b'$, which are connected with the interior of said chamber or sub-well $b^3$, each by an opening or passage, $b^4$, formed through the floor of said chamber or sub-well, the whole being so constructed and arranged that wires or cables passing through the conduit to which said station or well is connected may be entered into said chamber or sub-well $b^3$, and thence into and through a distributing duct or ducts, $b'$, into a diverging or distributing branch or branches of the system, substantially as described.

3. In a conduit system for electric conductors, the transversely-located electric-light-wire ducts $B^2$, constructed, arranged, and adapted to form part of the stations or wells B, or of the conduit intermediate said stations or wells, or both, and to be connected with auxiliary electric-light-wire conduits or service pipes, substantially as and for the purpose described.

JAMES F. MUNSIE.

Witnesses:
FANNIE A. CASE,
GEO. W. LEVIN.